UNITED STATES PATENT OFFICE.

WIGHTMAN W. GARNER AND ERNEST G. BEINHART, OF WASHINGTON, DISTRICT OF COLUMBIA.

PROCESS FOR PREVENTING THE DEVELOPMENT OF BLACK ROT AND OTHER FUNGOUS AND BACTERIAL DISEASES IN LEAF-TOBACCO.

1,268,070.

Specification of Letters Patent. Patented May 28, 1918.

No Drawing. Application filed January 10, 1918. Serial No. 211,164.

(DEDICATED TO THE PUBLIC.)

*To all whom it may concern:*

Be it known that we, WIGHTMAN W. GARNER and ERNEST G. BEINHART, citizens of the United States of America, and employees of the Department of Agriculture of said United States, residing at Washington, in the District of Columbia, (whose post-office address is Department of Agriculture, Washington, D. C.,) have jointly invented a new and useful Process for Preventing the Development of Black Rot and other Fungous and Bacterial Diseases in Leaf-Tobacco.

This application is made under the act of March 3, 1883, chapter 143 (22 Stat., 625), the invention herein described and claimed may be used by the Government of the United States or any of its officers or employees in the prosecution of work for the Government, or any person in the United States, without payment to us of any royalty thereon.

Our invention relates to a process for preventing the development of black rot and other fungous and bacterial diseases in leaf tobacco. This object is accomplished by controlling the moisture content at the time of packing the leaf for fermentation or storage, thereby removing the danger of loss by decay and rendering the process of fermentation and storage more uniform.

In the storage of tobacco in the leaf, more particularly that leaf intended for use in cigar manufacture, there frequently develops certain diseases which damage the quality of the leaf and cause loss. The principal disease of this kind is black rot, caused by a fungus commonly known as *Sterigmatocystis nigra* and is found to occur in all kinds of cigar tobaccos. The fungus is found on the tobacco leaf and under certain conditions of moisture and temperature feeds upon the leaf tissue, leaving a carbonaceous residue. Fungus may develop on any or all portions of the leaf and stem where there is an excess of moisture, but it is most frequently found on portions of the stem excessively high in moisture or on the leaf adjacent to portions of the stem, or midribs, or veins which have excessive amounts of contained moisture. Again colonies of spores, which bring about diseased areas, may be found on portions of the leaf to which water has been added by sprinkling, dipping or saturation under abnormal conditions.

Must also is an important disease occurring in stored tobacco.

Another condition frequently obtaining in stored leaf is what is known as a "tender" leaf where the leaf fiber is attacked while in storage by certain cellulose feeding organisms and results in the texture of the leaf becoming weakened.

Both diseases are found to occur in the ordinary packages used in the trade—in bales, boxes, or in bulk.

Cigar tobacco is ordinarily handled by fermenting in the bulk or large piles or in bales or boxes and less frequently in hogsheads. This fermentation is necessary to bring about the desired changes sought to prepare the leaf for use. As ordinarily done, the leaf is brought in from the farm curing barn to the sorting and packing house in such condition of softness that there is no danger of physical injury occurring. It is then sweated or fermented in piles and later sorted and packed, or it may be first sorted and packed and then sweated in packages. The first method, known as bulk sweating, is in rather general, though limited, use. A much larger proportion of the tobacco crop is, however, sweated or fermented in boxes or bales and even hogsheads of standard sizes. The leaves are tied in hands or small bundles, usually containing about 10 leaves, which are held together by another leaf or with raffia, cord, or similar material. These bundles, or hands, as they are usually termed, are laid in the containing box, bale or hogsheads in an orderly and neat manner and pressed.

It is well known that black rot and tender leaf and certain other diseases develop under certain conditions of moisture and temperature. We have found that "tender leaf" is caused by an excessive amount of moisture contained by the leaf tissue and usually occurs in the first part of the fermentation process. We have also found that the development of must is associated with tobaccos of thin texture that are packed with an excessive amount of moisture. We have further found that the development of black rot is associated with tobaccos that are packed in excessively high moisture or with veins or stems containing excessive amounts of moisture. We have found that normal tobacco, i. e., leaf, which passes through the fermentation without any damage and yields a product possessing the desired qualities usually possesses about 23 to 25 per cent. moisture, and any moisture above 25 per cent. may be regarded as excessive.

The stem of the normal leaf frequently has a moisture content of 1 or 2 per cent. higher than the leaf, and we regard a stem of normal moisture as being 24-27 per cent., and any amount above 27 per cent. may be regarded as excessive.

Therefore, in practice, it is desirable to pack the tobacco with the normal moisture content in order that there may be no liability of damage by black rot, tender leaf, or must.

We have discovered that by limiting the amount of moisture in the tobacco leaf and stem to the amount which will cause the product, when packed, properly to ferment, it will have the effect of preventing the development of fungous or other damaging diseases to the tobacco.

In order to accomplish this, we remove the greater part of the contained water in the leaf and then return to the leaf sufficient moisture to render it suitable for handling and packing and for fermentation. In removing moisture from the leaf, we simultaneously extract from the stem a large part of the moisture contained therein. In returning moisture to the leaf we simultaneous return moisture to the stem, but in this operation we limit the amount of moisture returned to the stem to the amount of moisture finally returned to the leaf, as hereinafter explained.

In practising our process we subject the tobacco leaf to currents of air of varying conditions of temperature and humidity. We first partially dry the tobacco leaf for a period of 30 to 60 minutes by subjecting the tobacco to the action of air heated to a temperature of 90° F. (32.0° C.) and containing a relative humidity of 45 per cent. Upon the expiration of this heating treatment, we raise the humidity to 75 per cent, keeping the temperature the same and subject the material to the action of such humidity and temperature for a period of 30 to 60 minutes, in order to allow a reabsorption in the outside cell walls, more particularly those of the midribs and veins, chiefly through osmosis. Following this treatment we lower the humidity to 35 per cent, keeping the temperature the same, and continue the drying operation at the temperature first specified and at the humidity last mentioned for a period of 60 to 120 minutes, or until the leaf is dry and the stem is firm. Upon completion of this step, we again raise the humidity to 75 or 80 per cent, keeping the temperature the same and subject the treated material to the action of such temperature and humidity from 50 to 120 minutes, or until the leaf is soft and the stem pliable, whereupon the temperature is raised to 105°-112° F. (40.0°-43.0° C.) and lower the humidity to 30 per cent, more or less, maintaining these conditions for 60 to 120 minutes, or until the stem is firm and hard. Finally the humidity is raised to 85 per cent., or as near that as can be done, the temperature remaining the same, as last specified. The tobacco leaf is kept under these conditions until the leaf is soft and contain 24 per cent moisture, and the stem is rendered pliable for easy handling and packing.

When the process is properly carried out in the manner hereinbefore described, there will be the normal moisture content in the leaf with sufficient moisture in the stem for safe handling and to bring about fermentation, the process simultaneously operating to remove the danger of feeding areas for fungi or deleterious bacteria.

By subjecting tobacco to varying conditions of temperature and humidity, as above described, we accomplish control of the moisture content of the leaf tissue and midribs (or stem) and veins so that sufficient moisture will be present to allow the leaf to undergo normal fermentation, while the deleterious action of certain fungi and bacteria is inhibited, more particularly the fungi which cause black rot and tender leaf.

Having thus described our process, we claim:

1. The hereindescribed method of treating leaf tobacco, consisting in subjecting the tobacco to alternate degrees of temperature and humidity for preventing the growth of fungous and other diseases in leaf tobacco.

2. The hereindescribed method of treating leaf tobacco, consisting in controlling the moisture content of tobacco by subjecting the material to the action of heated air at varying conditions of temperature and humidity for preventing the growth of fungous and other diseases in leaf tobacco.

In witness whereof, we affix our signatures in the presence of two subscribing witnesses.

WIGHTMAN W. GARNER.
ERNEST G. BEINHART.

Witnesses:
H. E. ALLARD,
W. M. LUNN.